（12）United States Patent
Suzuki et al.

(10) Patent No.: US 9,143,700 B2
(45) Date of Patent: Sep. 22, 2015

(54) IMAGE CAPTURING DEVICE FOR CAPTURING AN IMAGE AT A WIDE ANGLE AND IMAGE PRESENTATION SYSTEM

(71) Applicant: FUTURE UNIVERSITY HAKODATE, Hakodate, Hokkaido (JP)

(72) Inventors: Sho'ji Suzuki, Hakodate (JP); Ryoichi Kaneno, Hakodate (JP)

(73) Assignee: FUTURE UNIVERSITY HAKODATE, Hakodate (JP)

( * ) Notice: Subject to any disclaimer, the term of this patent is extended or adjusted under 35 U.S.C. 154(b) by 53 days.

(21) Appl. No.: 13/931,231

(22) Filed: Jun. 28, 2013

(65) Prior Publication Data

US 2013/0286255 A1    Oct. 31, 2013

Related U.S. Application Data

(63) Continuation of application No. PCT/JP2011/006832, filed on Dec. 6, 2011.

(30) Foreign Application Priority Data

Dec. 28, 2010    (JP) .................................. 2010-292689

(51) Int. Cl.

| H04N 5/262 | (2006.01) |
|---|---|
| G03B 17/17 | (2006.01) |
| G03B 19/02 | (2006.01) |
| G03B 37/06 | (2006.01) |
| H04N 5/225 | (2006.01) |
| H04N 5/232 | (2006.01) |

(52) U.S. Cl.
CPC .............. *H04N 5/2621* (2013.01); *G03B 17/17* (2013.01); *G03B 19/023* (2013.01); *G03B 37/06* (2013.01);

(Continued)

(58) Field of Classification Search
CPC ... H04N 5/262; H04N 5/2621; H04N 5/2258; H04N 5/2254; H04N 5/2259; H04N 5/23238; G03B 17/00; G03B 17/17; G03B 19/023; G03B 19/12; G03B 19/14; G03B 37/04; G03B 37/06
USPC ............. 348/239, 333.08, 333.1, 36–60, 584, 348/211.11; 359/362–366, 443–461, 359/725–731, 838, 859, 863
See application file for complete search history.

(56) References Cited

U.S. PATENT DOCUMENTS

| 6,597,410 B1 * | 7/2003 | Doany et al. ................... 348/744 |
| 7,952,606 B2 * | 5/2011 | Kweon et al. ................... 348/36 |

(Continued)

FOREIGN PATENT DOCUMENTS

| JP | 2000-322564 A | 11/2000 |
| JP | 2002-271675 A | 9/2002 |

(Continued)

*Primary Examiner* — Pritham Prabhakher
(74) *Attorney, Agent, or Firm* — Muncy, Geissler, Olds & Lowe, P.C.

(57) ABSTRACT

A first imaging unit is configured to capture an image showing a subject in front. A convex reflector is located behind an imaging plane of an optical system formed by the first imaging unit and is configured to share an optical axis with the first imaging unit and mirror a subject beside the convex reflector, a convex portion of the convex reflector being oriented forward. A second imaging unit is configured to share the optical axis with the first imaging unit and capture an image mirrored by the convex reflector. An image processing unit is configured to adjust a resolution of images captured by the first and the second imaging units, obtain a mirror-reversed image from the image captured by the first imaging unit or the image captured by the second imaging unit, and blend the mirror-reversed image with the other image.

6 Claims, 11 Drawing Sheets

(52) U.S. Cl.
CPC ........... *H04N 5/2254* (2013.01); *H04N 5/2258* (2013.01); *H04N 5/2259* (2013.01); *H04N 5/23238* (2013.01)

(56) References Cited

U.S. PATENT DOCUMENTS

| | | | | |
|---|---|---|---|---|
| 8,174,562 | B2* | 5/2012 | Hartman | 348/42 |
| 2003/0007793 | A1* | 1/2003 | Suzuki | 396/20 |
| 2006/0023105 | A1* | 2/2006 | Kostrzewski et al. | 348/335 |
| 2006/0033985 | A1* | 2/2006 | Mian | 359/366 |
| 2006/0268103 | A1* | 11/2006 | Kweon et al. | 348/36 |
| 2011/0058014 | A1* | 3/2011 | Yamashita et al. | 348/36 |

FOREIGN PATENT DOCUMENTS

| | | |
|---|---|---|
| JP | 2003-005273 A | 1/2003 |
| JP | 2003-510666 A | 3/2003 |
| JP | 2004-135182 A | 4/2004 |
| WO | WO01/24515 A1 | 4/2001 |

* cited by examiner

IMAGE CAPTURING DEVICE FOR CAPTURING AN IMAGE AT A WIDE ANGLE AND IMAGE PRESENTATION SYSTEM

BACKGROUND OF THE INVENTION

1. Field of the Invention

The present invention relates to an image capturing device and an image presentation system, and, more particularly, to a device for capturing an image at a wide angle and a system of presenting an image captured by using the device.

2. Description of the Related Art

Devices capable of capturing an image showing an all-round view are known in the related art. Some of these devices are designed to capture an image by using a combination of a wide-angle camera and a camera configured to capture an image using a curved reflector (see, for example, patent document 1).

[patent document 1] JP2000-322564

Images captured by the related-art device may sometimes contain a discontinuous boundary. In such an image, what should otherwise appear as one subject in the image looks divided. For example, this could happen when a large subject is captured in an image. Further, the motion of a motion-rich subject captured in moving images, which should otherwise be traced smoothly in the moving images, would appear punctuated and discontinuous. In particular, some images may look as if the direction of motion of the subject changes before and after the punctuation with the result that the subject is difficult to track.

Thus, the related-art devices may require further image processing (e.g., reconstruction of divided images) in order to view a subject as a single image. It is therefore believed that the related-art devices capable of capturing an image at a wide leave room for improvement.

SUMMARY OF THE INVENTION

The present invention addresses the issue and a purpose thereof is to provide a technology capable of capturing a wide-angle image containing few discontinuous boundaries.

One embodiment of the present invention relates to an image capturing device. The device comprises: a first imaging unit configured to capture an image showing a subject in front; a convex reflector located behind an imaging plane of an optical system formed by the first imaging unit and configured to share an optical axis with the first imaging unit and mirror at least a subject beside the convex reflector, a convex portion of the convex reflector being oriented forward; a second imaging unit configured to share the optical axis with the first imaging unit and capture an image mirrored by the convex reflector; and an image processing unit configured to adjust a resolution of an image captured by the first imaging unit and an image captured by the second imaging unit, obtain a mirror-reversed image from the image captured by the first imaging unit or the image captured by the second imaging unit, and blends the mirror-reversed image with the other image.

Another embodiment of the present invention relates to an image presentation system. The system comprises: the aforementioned image capturing device; a projection unit configured to project an image generated by the image capturing device; and a curved screen configured to reflect the image from the projection unit.

Optional combinations of the aforementioned constituting elements, and implementations of the invention in the form of methods, apparatuses, serves, systems, optical systems, computer programs, and recording mediums may also be practiced as additional modes of the present invention.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE INVENTION

The invention will now be described by reference to the preferred embodiments. This does not intend to limit the scope of the present invention, but to exemplify the invention.

(First Embodiment)

Figure 1:
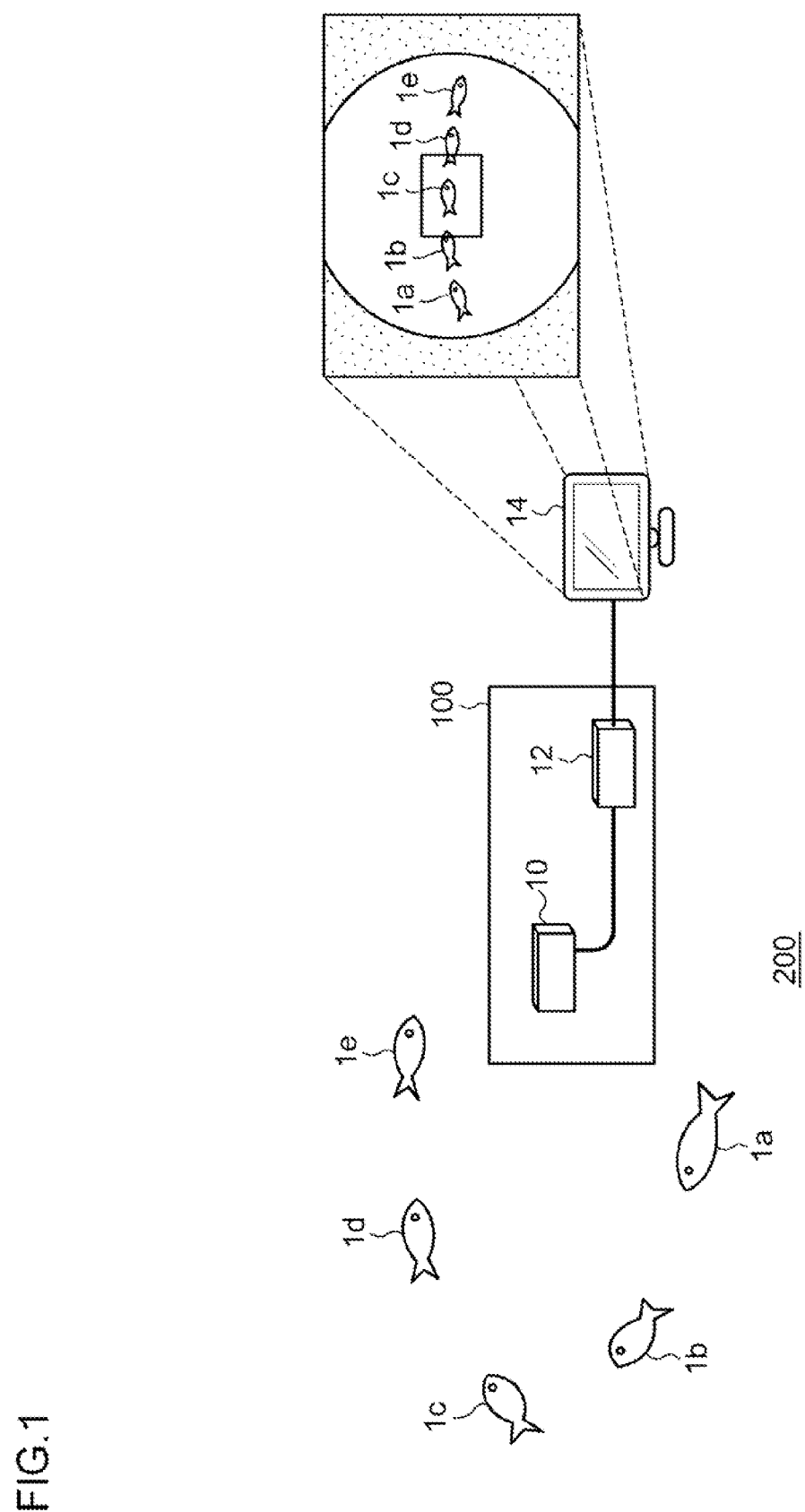
FIG. 1 schematically shows an overview of an image presentation system according to an embodiment.

FIG. 1 schematically shows an overview of an image presentation system 200 according to the first embodiment. The image presentation system 200 includes an image capturing device 100 and a display unit 14, the image capturing device 100 including a visual sensor 10 and an image processing unit 12. FIG. 1 shows how subjects 1a, 1b, 1c, 1d, and 1e, which are generically referred to as subjects 1, are captured by using the image presentation system 200. The visual sensor 10 includes two cameras. The image processing unit 12 blends images captured independently by the two cameras. The display unit 14 displays the result of blending. Details will be described later. For example, a user interface (not shown) such as a keyboard and a mouse is connected to the image capturing device 100. The user interface is capable of designating a change in a parameter used by the image processing unit 12.

Figure 2:
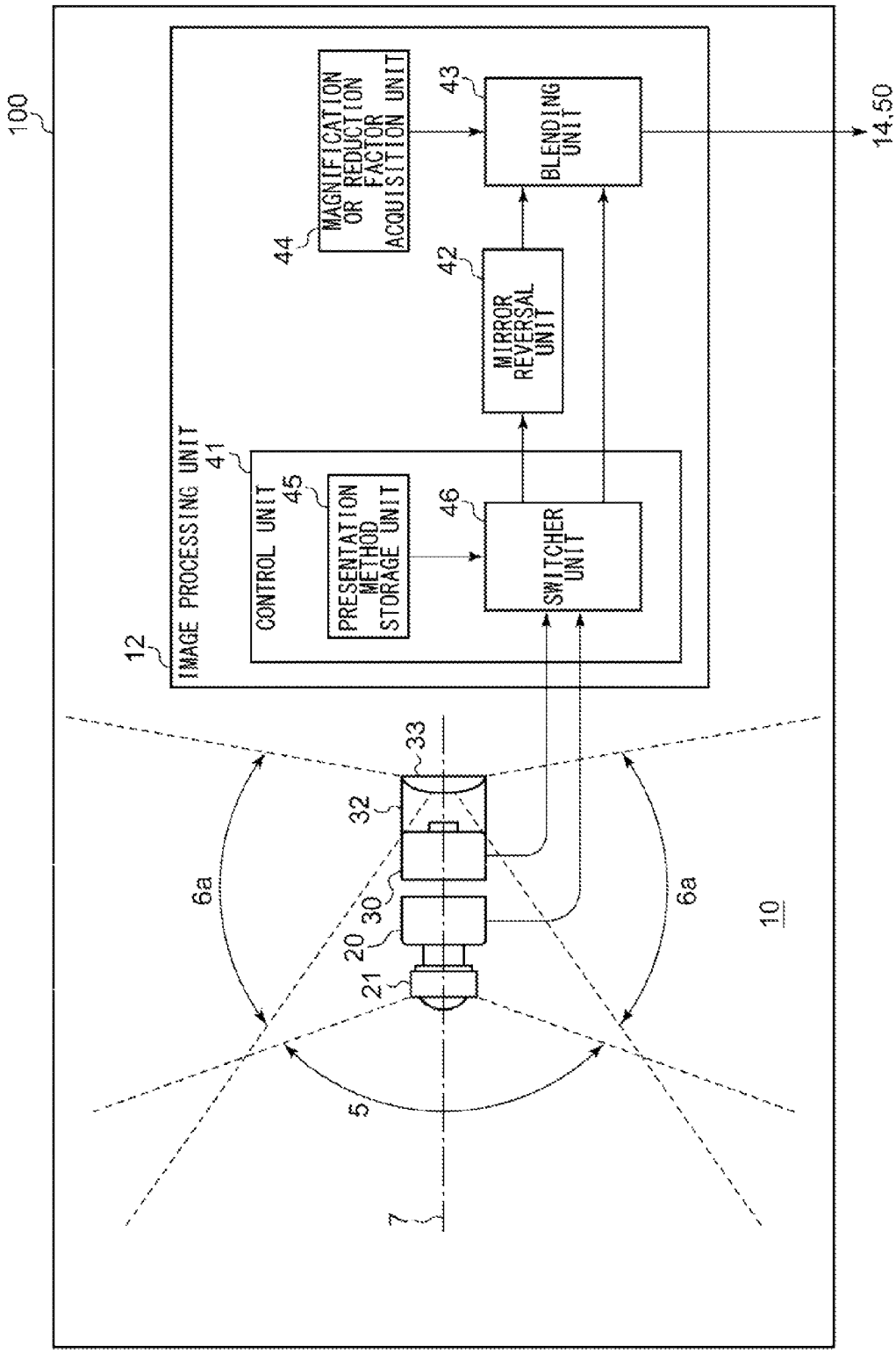
FIG. 2 schematically shows the internal configuration of the image capturing device according to the embodiment.

FIG. 2 schematically shows the internal configuration of the image capturing device 100 according to the first embodiment. The image capturing device 100 includes the visual sensor 10 and the image processing unit 12.

The visual sensor 10 includes a total of two cameras including a camera as a first imaging unit 20 and a camera as a second imaging unit 30 and also includes a convex reflector 33 curved in a convex manner. The first imaging unit 20 is provided with a lens 21 for capturing an image showing a subject in front of the visual sensor 10. Therefore, the first imaging unit 20 fitted with the lens 21 will hereafter simply referred to as the "first imaging unit 20". An image showing a subject in front of the visual sensor 10 is captured by the first imaging unit 20. The captured image is transmitted to the image processing unit 12 described later.

The second imaging unit 30 share an optical axis 7 with the first imaging unit 20. The second imaging unit 30 is located back-to-back behind the first imaging unit 20. The directions of capturing images differ by 180°. Hereinafter, the direction in which the first imaging unit 20 captures an image will be referred to as "front (forward)" and the direction in which the second imaging unit 30 captures an image will be referred to as "behind (backward)". The convex reflector 33 curved in a convex manner is fitted behind the second imaging unit 30 using a light transmitting frame 32. The second imaging unit 30 captures an image including a subject outside the field of view of the first imaging unit 20. An image showing a subject beside the visual sensor 10 is reflected by the convex reflector 33 before being captured by the second imaging unit 30. The captured image is transmitted to the image processing unit 12 described later. The first imaging unit 20 and the second imaging unit 30 can be implemented by a known technology such as that of a charge coupled device (CCD) camera. The convex reflector 33 can be implemented by a hyperboloidal mirror, a hemispherical mirror, etc.

Like the second imaging unit 30, the convex reflector 33 also shares the optical axis 7 with the first imaging unit 20. Thus, the optical axis 7 is common to the first imaging unit 20, the second imaging unit 30, and the convex reflector 33. The first imaging unit 20, the second imaging unit 30, and the convex reflector 33 are located relative to each other such that the convex reflector 33 is located behind the optical imaging plane of the first imaging unit 20. The convex part of the convex reflector 33 faces the forward direction.

Referring to FIG. 2, by locating the first imaging unit 20, the second imaging unit 30, and the convex reflector 33 as described above, the first imaging unit 20 captures an image in front (an image covering a range indicated by numeral 5), the second imaging unit 30 captures an image showing a subject on the sides mirrored by the convex reflector 33 (an image covering a range indicated by numeral 6a). By allowing the first and second imaging units 20 and 30 to capture images in different directions, the images can complement each other. As a result, it is possible to capture an image covering a range with a wider angle of view as whole than an image captured by one of the imaging units.

Since the convex reflector 33 inherently mirrors the second imaging unit 30, the second imaging unit 30 will also capture an image of the second imaging unit 30 itself mirrored by the convex reflector 33. Since the second imaging unit 30 is not a target of imaging as intended, the image showing a subject on the sides indicated by numeral 6a represents an image covering the substantial imaging range that should be captured by the second imaging unit 30. In this sense, the second imaging unit 30 itself represents a cause of the blind angle in the image mirrored by the convex reflector 33. As a result of recent rapidly growing efforts to reduce the size of imaging devices, CCD cameras used in the first and second imaging units 20 and 30 are available in smaller sizes than in the related art. This results in smaller blind angle than in the related art. The image including the range of the blind angle is captured by the first imaging unit 20.

It should be noted that the resolution of the image captured by the first imaging unit 20 and the resolution of the image captured by the second imaging unit 30 may differ. For example, given that the first and second imaging units 20 and 30 are implemented by cameras generating images of the same pixel count, the resolution of the image captured by the first imaging unit 20 will differ from the resolution of the image captured by the second imaging unit 30 because the second imaging unit 30 captures an image covering a wider range than the first imaging unit 20. Further, since the second imaging unit 30 captures an image reflected from the convex reflector 33, a subject captured by the first imaging unit 20 and the same subject captured by the second imaging unit 30 will be mirror reversals of each other in the respective images.

Therefore, the image processing unit 12 generates a blended image by processing the image captured by the first imaging unit 20 and the image captured by the second imaging unit 30. For this purpose, the image processing unit 12 includes a mirror reversal unit 42, a blending unit 43, a control unit 41 for controlling images input to the mirror reversal unit 42 and the blending unit 43, and a magnification or reduction factor acquisition unit 44.

The control unit 41 further includes a presentation method storage unit 45 and a switcher unit 46. The switcher unit 46 acquires the image captured by the first imaging unit 20 and the image captured by the second imaging unit 30. In case the first and second imaging units 20 and 30 generate moving images, the switcher unit 46 acquires images in units of frames from the first and second imaging units 20 and 30 in synchronization with the frame rate. The switcher unit 46 acquires a presentation method from the presentation method storage unit 45 and outputs the image acquired from the first imaging unit 20 or the second imaging unit 30 to the mirror reversal unit 42. The presentation method storage unit 45 will be described later.

The mirror reversal unit 42 reverses the image acquired from the switcher unit 46. Normally, the image from the second imaging unit 30 output from the switcher unit 46 is reversed. This returns the image reversed by the convex reflector 33 to the original state that is not mirror reversed. The blending unit 43 acquires the image captured by the first imaging unit 20 from the switcher unit 46 and acquires the mirror reversal of the'image captured by the second imaging unit 30 from the mirror reversal unit 42. If a blended image should be acquired as a mirror-reversed image, the mirror reversal unit 42 acquires the image captured by the first imaging unit 20 from the switcher unit 46 and reverses the image. The blending unit 43 acquires the image captured by the second imaging unit 30 from the switcher unit 46 and acquires the mirror reversal of the image captured by the first imaging unit 20 from the mirror reversal unit 42. The blending unit 43 subsequently adjusts the resolution of the two images acquired.

By way of a specific example, it will be assumed that the image captured by the first imaging unit 20 and the image captured by the second imaging unit 30 are images of Video Graphics Array (VGA) size having 640 pixels horizontally and 480 pixels vertically. It will also be assumed that the image ultimately output from the blending unit 43 is also of VGA size. It will be assumed that the imaging range of the image captured by the first imaging unit 20 corresponds to an image of 160×120 pixels in the image captured by the second imaging unit 30. In other words, the resolution of the image captured by the first imaging unit 20 is four times the resolution of the image captured by the second imaging unit 30. In this case, the blending unit 43 reduces the vertical and horizontal sizes of the image captured by the first imaging unit 20 to ¼ so as to fit the resolution of the image captured by the second imaging unit 30. The reduction factor is stored in a storage (not shown) in the magnification or reduction factor acquisition unit 44 as a standard magnification or reduction factor. The blending unit 43 reads the standard magnification or reduction factor from the magnification or reduction factor acquisition unit 44 and uses the factor accordingly.

As described above, the first imaging unit 20, the second imaging unit 30, and the convex reflector 33 share the optical axis 7. Accordingly, the center of the image captured by the first imaging unit 20 is aligned with the center of the image captured by the second imaging unit 30. Therefore, the blending unit 43 overwrites the center of the image from the second imaging unit 30 with a portion or the entirety of the reduced version of the image from the first imaging unit 20 so as to generate a single blended image. In this process, the blending unit 43 acquires the size and shape of the overwritten area from the presentation method storage unit 45 and defines the area at the center of the image from the second imaging unit 30. The blending unit 43 also crops the overwriting image from the reduced version of the image from the first imaging unit 20. This produces a blended image in which a field of view having a range of 180 degrees vertically and horizontally is captured and in which the subject is captured in the field of view in a natural perspective. Depending on the shape of the convex reflector 33, the imaging range extends behind the reflector so that it is possible to capture a field of view beyond 180 degrees. By properly adjusting the size and shape of the overwriting area as well as the magnification or reduction factor, the blended image will include only a small blind angle and few discontinuous boundaries.

The image capturing device 100 and the internal configuration depicted in FIGS. 1 and 2 are implemented in hardware such as an optical system including a lens, a mirror, etc., a Central Processing Unit (CPU) of an arbitrary computer, a memory, and other Large Scale Integrations (LSI), and in software such as a program etc. loaded into the memory. FIGS. 1 and 2 depict functional blocks implemented by the cooperation of these elements. Therefore, it will be obvious to those skilled in the art that the functional blocks may be implemented in a variety of manners by hardware only, software only, or a combination of thereof.

Figure 3A:
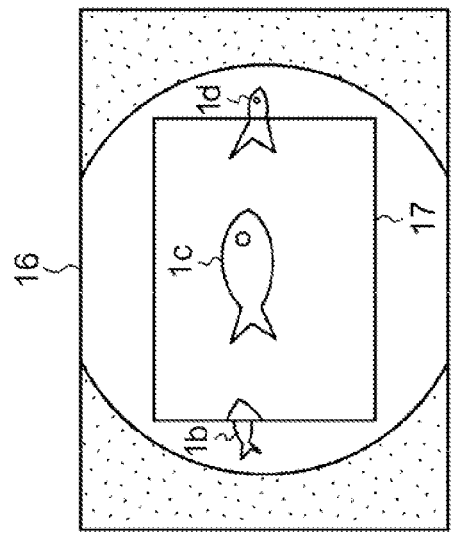
FIGS. 3A-3D schematically show exemplary images blended by the image capturing device according to the embodiment.

FIG. 3A schematically shows an exemplary image blended by the image capturing device 100 according to the embodiment. The image shows subjects 1 in FIG. 1 by way of example. Referring to FIG. 3A, the field in front of the visual sensor 10 captured by the first imaging unit 20 is imaged in a portion indicated by a rectangular area 17. Subjects above, below, and beside the visual sensor 10 reflected by the convex reflector 33 and captured by the second imaging unit 30 are imaged in a portion indicated by a circular area 16 excluding the rectangular area 17. Referring to FIG. 3A, the vertical and horizontal directions in the image match the positioning of the subjects 1 relative to the image capturing device 100.

Figure 3B:
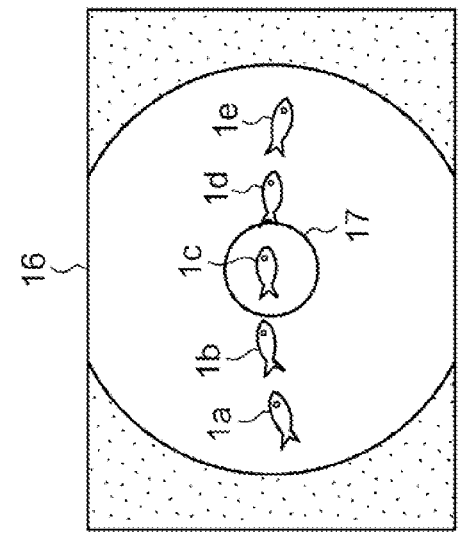

FIG. 3B is a blended image produced by changing a ration between the proportion occupied by the rectangular area 17 in the blended image and the proportion occupied by the circular area 16 excluding the rectangular area 17. The image shown in FIG. 3B shows the center of the image shown in FIG. 3A on an enlarged scale. The magnification or reduction factor acquisition unit 44 in FIG. 2 is connected the aforementioned user interface, allowing the user of the image capturing device 100 to define a magnification or reduction factor of the blended image output by the blending unit 43 via the user interface.

By way of a specific example, it will be assumed as in the foregoing example that the image captured by the first imaging unit 20, the image captured by the second imaging unit 30, and the image ultimately output by the blending unit 43 are images of VGA size. It will further be assumed that the magnification or reduction factor acquisition unit 44 acquires from the user an instruction designating that the factor of magnifying or reducing the image output from the blending unit 43 vertically and horizontally should be 200%. In this case, the rectangular area 17, the image captured by the first imaging unit 20, will correspond to an image of 320×240 pixels. Accordingly, the blending unit 43 reduces the vertical and horizontal sizes of the image captured by the first imaging unit 20 to ½, magnifies the vertical and horizontal sizes of the image captured by the second imaging unit 30 by a factor of 2, and blends the resultant images. Subsequently, the blending unit 43 crops an image of VGA size at the center of the blended image and outputs the cropped image as the ultimate blended image.

Thus, if the magnification or reduction factor acquisition unit 44 acquires from the user an instruction designating that the magnification or reduction factor of the blended image should be changed, the blending unit 43 re-adjusts the resolution of the image captured by the first imaging unit 20 and the resolution of the image captured by the second imaging unit 30 and re-builds a blended image. In comparison with the aforementioned case of magnifying the generated blended image using the standard magnification or reduction factor, the inventive approach is advantageous in that an image with a higher quality is obtained. This is because the reduction factor of the image captured by the first imaging unit 20 is controlled and much of high-frequency components contained in the original image is retained accordingly.

Figure 3C:
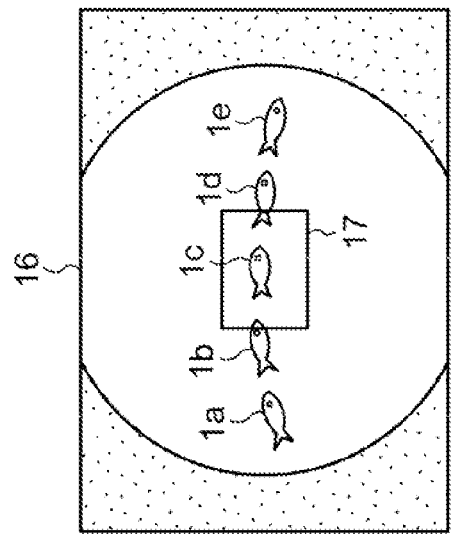
Figure 3D:
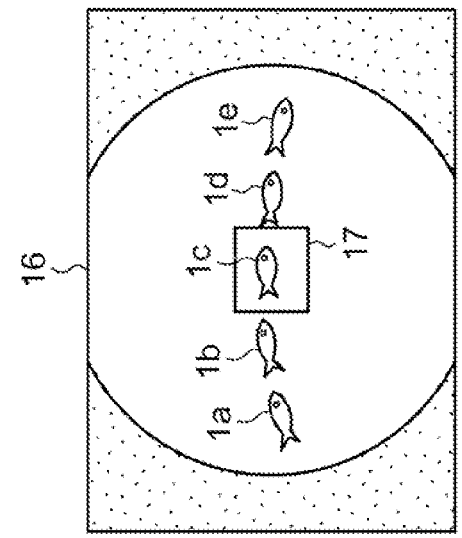

FIGS. 3C and 3D show images produced from the image show in FIG. 3A by cropping a portion of the image captured by the first imaging unit 20 and then blending the images. FIG. 3C shows an image produced by cropping a square image so that the image from the first imaging unit 20 has an aspect ratio of 1:1 and blending the cropped image with the image from the second imaging unit 30. The cropped image has the same angle of view vertically and horizontally. FIG. 3D shows an image produced by circularly cropping the image captured by the first camera and blending the cropped image with the image from the second camera. The cropped image complements the circular blind angle area located at the center of the image captured by the second imaging unit 30 in a natural fashion.

As shown in FIG. 1, by viewing the blended image blended by the blending unit 43 and displayed on the display unit 14, the user can capture an image with a wide angle of view. The device for viewing the blended image may not necessarily be a flat shaped such as a monitor but may be a structure with a curved surface. A description will now be given of such a variation.

Figure 4A:
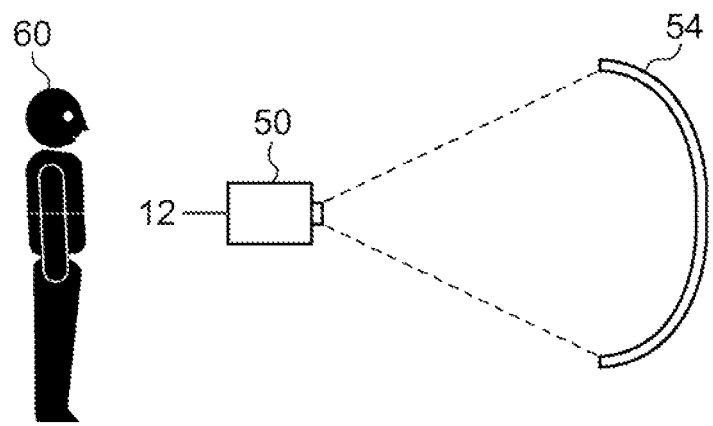
FIGS. 4A-4B show how a blended image is projected toward a projection plane having a curved surface.

FIG. 4A shows how the blended image blended by the blending unit 43 is projected toward an opening of a projection plane having a curved surface. More specifically, the image blended by the blending unit 43 in the image processing unit 12 is projected toward an opening of a curved screen 54 by using a projector 50, and a user 60 views the image projected onto the curved screen 54 in the direction of projection. The farther a subject 1 is from the visual sensor 10 in the forward direction, the farther from the user 60 the subject is projected onto the curved screen 54. Thus, the above approach is advantageous in that the perspective is presented in a natural fashion.

Figure 4B:
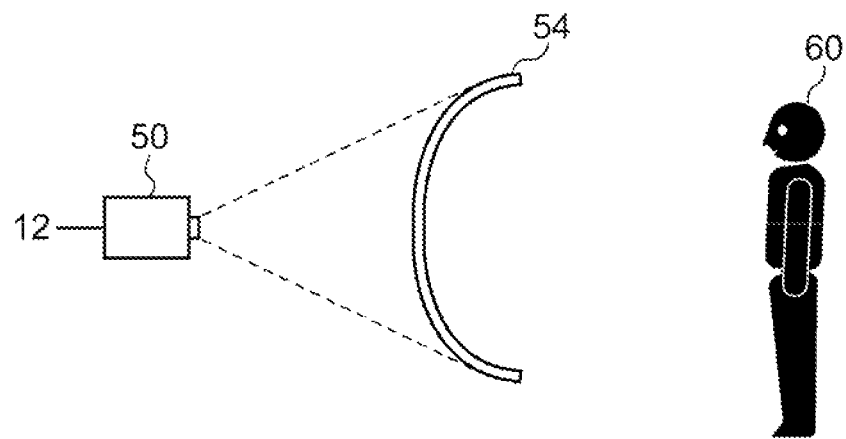

FIG. 4B shows how the blended image blended by the blending unit 43 is projected toward the back of a projection plane having a curved surface. Unlike the case shown in FIG. 4A, the user 60 views the image transmitted through the curved screen 54 in a direction opposite to the direction of projection. In the case shown in FIG. 4B, as in the case shown in FIG. 4A, the farther a subject 1 is from the visual sensor 10 in the forward direction, the farther from the user 60 the subject is projected onto the curved screen 54. Thus, the perspective is presented in a natural fashion. In further accordance with the case shown in FIG. 4B, the shape of the curved screen 54 onto which the image is projected will be similar to the shape of the convex reflector 33. For this reason, the image temporarily distorted by the convex reflector 33 is corrected by being projected onto the convex shape of the curved screen 54. Thus, a more natural image can be presented. In this sense, it is favorable that the center of the curved screen 54 corresponding to the location where the image captured by the first imaging unit 20 is projected be not curved. In the case that the convex reflector 33 is a hyperboloidal mirror, however, the central portion thereof approximates a plane so that a curved surface obtained from enlarging a hyperboloid can be used as a screen. In this case, the shape of the enlarged curved surface in the cross section including the optical axis can be approximated by a polynomial. In practice, a curve approximated by a biquadratic can be used to build a screen. Further, since the shape of a curved surface obtained by enlarging a hyperboloid is similar to a hemisphere, a hemispherical surface may also be used as a screen.

In the case shown in FIG. 4B, the image of FIG. 4A is viewed from the opposite direction. It should therefore be reminded that the image in the case of FIG. 4A and the image in the case of FIG. 4B will be mirror-reversed. For this reason, the switcher unit 46 outputs the image acquired from the first imaging unit 20 to the mirror reversal unit 42 before allowing the light transmitted through the curved screen 54 to be viewed as shown in FIG. 4B. The blending unit 43 blends the image captured by the second imaging unit 30 and acquired from the switcher unit 46 with the mirror reversal of the image captured by the first imaging unit 20 and acquired from the mirror reversal unit 42, adjusting the resolution. As a result, the image projected by the projector 50 will be a mirror reversed image so that the image viewed by the user 60 will not be a mirror reversed image as a result.

Thus, the switcher unit 46 determines which of the image captured by the first imaging unit 20 and the image captured by the second imaging unit 30 should be mirror-reversed according to the method of presenting an image ultimately used. For this purpose, the presentation method storage unit 45 is connected to the aforementioned user interface and is configured to acquire information on the presentation method from the user and store the information. Hereinafter, the presentation method as shown in FIG. 4A will be referred to as "projection type" and the presentation method as shown in FIG. 4B will be referred to as "transmission type". The switcher unit 46 acquires the presentation method from the presentation method storage unit 45 and controls the image output to the mirror reversal unit 42 and the blending unit 43 according to the acquired presentation method.

Figure 5A:
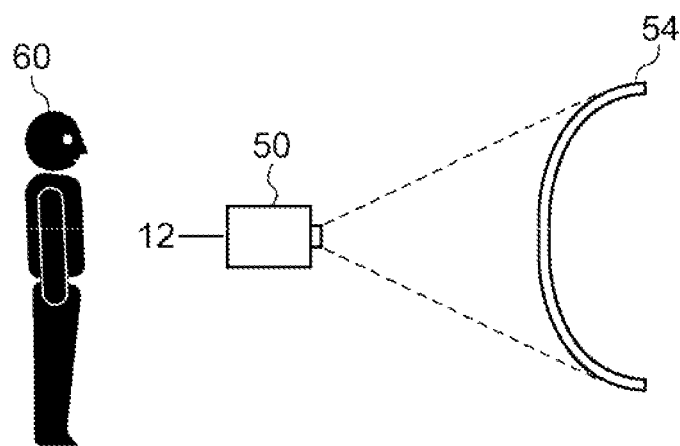
FIGS. 5A-5B show how a blended image is projected toward a projection plane having a curved surface in an alternative manner.
Figure 5B:
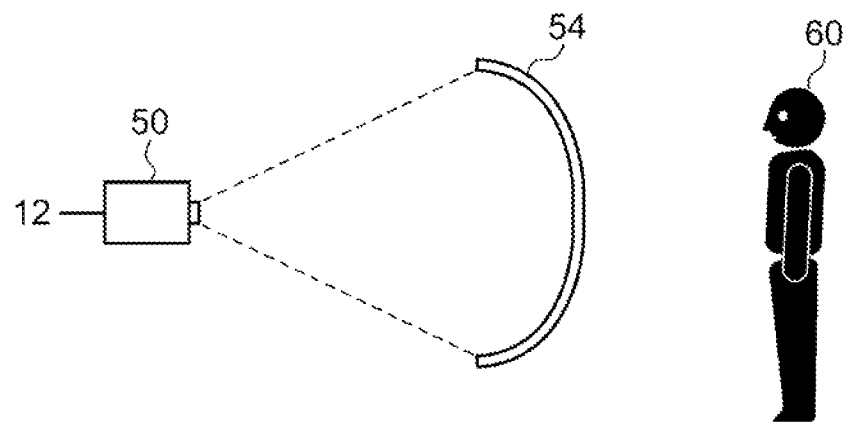

FIG. 5A shows how the blended image blended by the blending unit 43 is projected toward the back of the opening of the curved screen 54. FIG. 5B shows how the blended image blended by the blending unit 43 is projected toward the back of the curved screen 54. In the case of FIG. 5B, as in the case of FIG. 4B, the switcher unit 46 outputs the image acquired from the first imaging unit 20 to the mirror reversal unit 42 so that the user 60 can view the image not mirror reversed.

Figure 6:
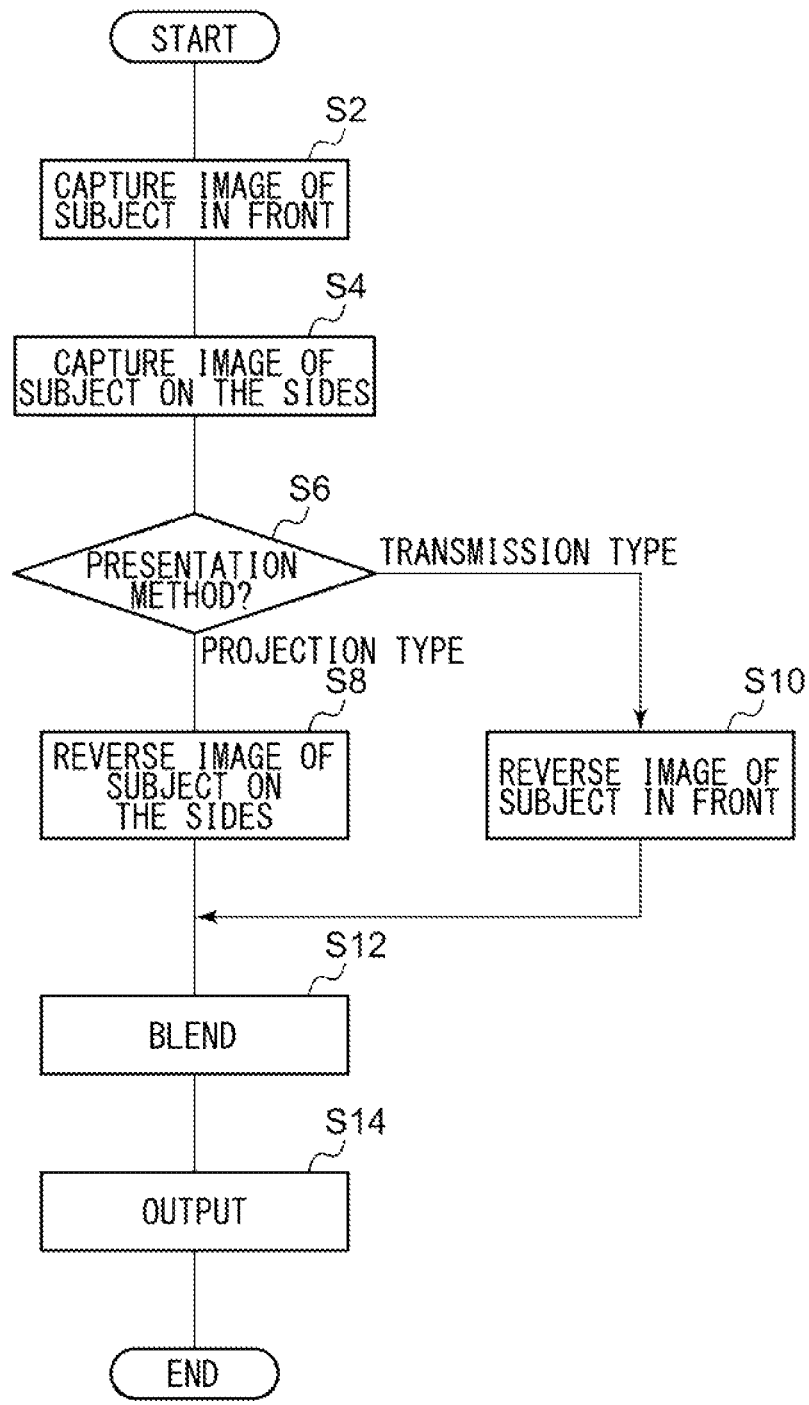
FIG. 6 is a flowchart showing the steps performed in the image capturing device according to the embodiment.

FIG. 6 is a flowchart showing the steps performed in the image capturing device 100 according to the first embodiment. The process in the flowchart is started when the image capturing device 100 starts capturing an image.

The first imaging unit 20 captures an image in front of the visual sensor 10 (S2). The second imaging unit 30 captures an image showing a subject located beside the visual sensor 10 and reflected in the convex reflector 33 (S4). Subsequently, the switcher unit 46 refers to the presentation method storage unit 45 and learns the method of presenting a blended image. If the presentation method is of projection type (projection type in S6), the switcher unit 46 outputs the image showing a subject on the sides and captured by the second imaging unit 30 to the mirror reversal unit 42, and the mirror reversal unit 42 reverses the acquired image (S8). If the presentation method is of transmission type (transmission type in S6), the switcher unit 46 outputs the image showing a subject in front and captured by the first imaging unit 20 to the mirror reversal unit 42, and the mirror reversal unit reverses acquired image (S10).

The blending unit 43 blends the image that the switcher unit 46 did not transfer to the mirror reversal unit 42 and the image output from the mirror reversal unit 42, adjusting the resolution (S12). The projector 50 projects the blended image blended by the blending unit 43 to the curved screen 54 (S14). When the projector 50 outputs the blended image, the process in the flowchart is terminated.

A description will be given of further details of the image capturing device 100 according to the first embodiment.

FIG. 7 shows an exemplary image acquired by the image capturing device 100 including the visual sensor 10 according to the first embodiment. In the example shown in FIG. 7, a hyperboloidal mirror having a diameter of 30 mm is used as the convex reflector 33 of the image capturing device 100. The shape of a hyperboloid is defined by constants a and b that meet $c=(a^2+b^2)^{1/2}$, where the distance between the two focal points is denoted by $2c$.

A wide-angle lens having a field angle of 125° is used as the lens 21 of the visual sensor 10. The hyperboloidal mirror of the convex reflector 33 is capable of capturing an image in the range of 55° in front and 10° behind. The field of view of the visual sensor 10 will be 200° horizontally and 180° vertically.

Figure 7A:
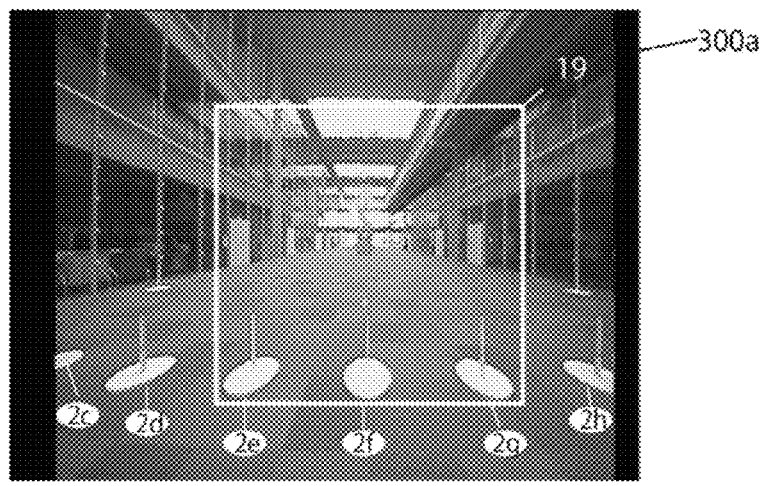
FIGS. 7A-7C show exemplary images blended by the image capturing device according to the embodiment.
Figure 7B:
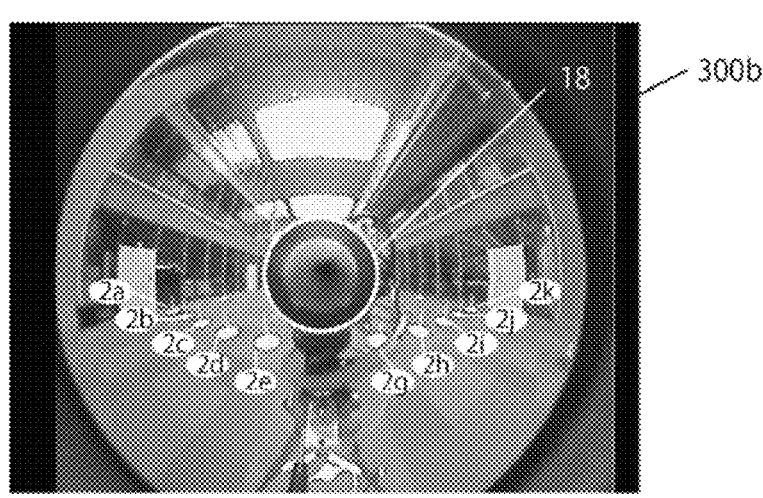
Figure 7C:
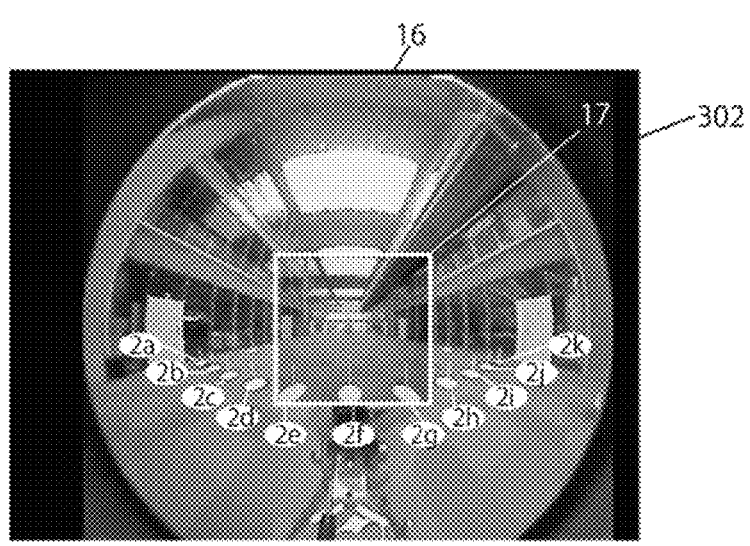

FIG. 7A shows an exemplary image captured by the first imaging unit 20, and FIG. 7B shows an exemplary image obtained by reversing the image captured by the second imaging unit 30 using the mirror reversal unit 42. An image 300a captured by the first imaging unit 20 and an image 300b obtained by reversing the image captured by the second imaging unit 30 using the mirror reversal unit 42 are both images of 640×480 pixels. FIG. 7C shows an exemplary image blended by the blending unit 43. A blended image 302 produced by blending the image 300a and the image 300b in the blending unit 43 is also an image of 640×480 pixels.

In the blended image 302, the image 300b is captured in the circular area 16. A circular blind angle portion 18 is overwritten by the rectangular area 17 which is square shaped. Further, the overwriting rectangular area 17 is produced by cropping a rectangular area 19 in the image 300a and reducing the cropped image by a factor of 0.47.

A total of 11 subjects 2a through 2k having a height of 0.5 m are located at a distance of 1.5 m in front of the visual sensor 10. In the blended image 302, all of the subjects are captured. Meanwhile, only 10 subjects excluding the central subject 2f is captured in the image 300b, and 5 subjects from 2d through 2h located near the center plus a portion of the subject 2c are only captured in the image 300a. The blended image 302 shows that a blended image covers a wider field of view than individual images and a natural image that is less discontinuous is obtained.

Figure 8:
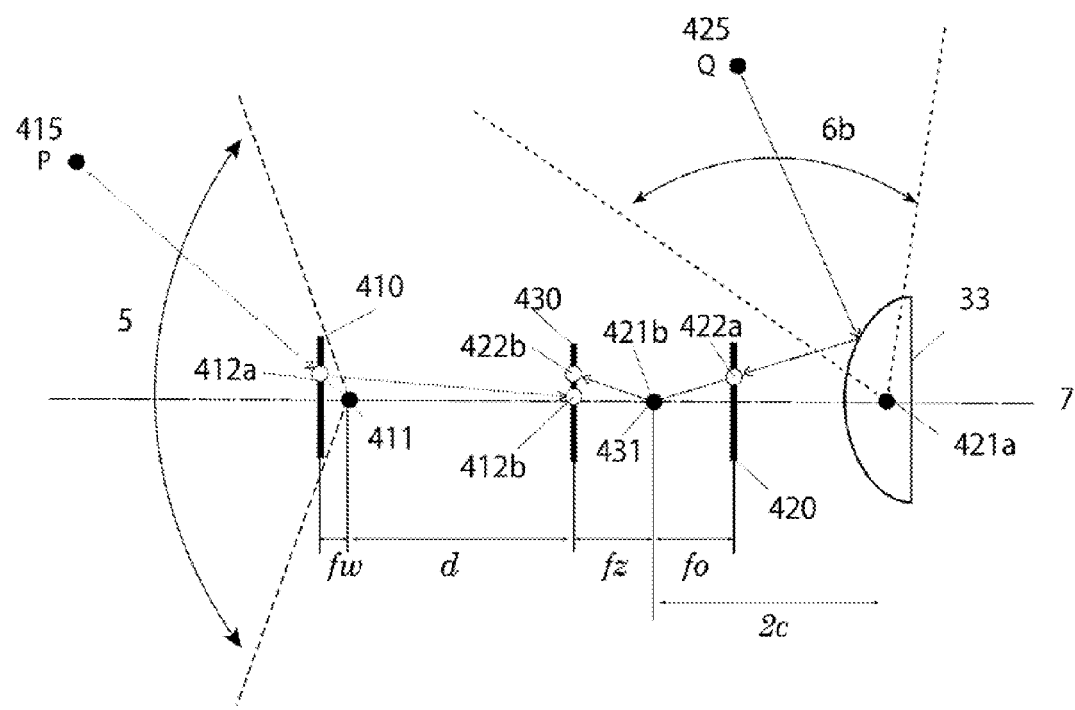
FIG. 8 schematically shows a process of producing a blended image according to an example.

FIG. 8 schematically shows a process of producing a blended image 302 in the blending unit 43 by way of illustrating projection in a plane including the optical axis 7. An imaging plane 410 of the first imaging unit 20 is located at a distance fw from a center of projection 411 of the imaging unit 20. An imaging plane 420 of the second imaging unit 30 is located at a distance fo from a center of projection 421b of the second imaging unit 30.

A virtual imaging plane 430 of the blended image is located between the center of projection 411 of the first imaging unit 20 and the center of projection 421b of the second imaging unit 30. A center of projection 431 of the blended image is aligned with the center of projection 421b of the second imaging unit 30. The distance between the virtual imaging plane 430 and the center of projection 431 will be denoted by fz, and the distance between the virtual imaging plane 430 and the center of projection 411 of the first imaging unit 20 will be denoted by d. The blended image is obtained by re-projecting points of projection on the imaging plane 410 and the imaging plane 420 onto the virtual imaging plane 430.

The positions of a point P415 and a point Q425 in the space are identified in the coordinate system defined with the center of projection 411 of the first imaging unit 20 as the origin. The direction parallel with the optical axis 7 and in front of the visual sensor 10 is defined as the positive direction in the Z axis. The X and Y axes are defined in the horizontal direction (transversal direction) and the vertical direction (height direction) of the imaging plane, respectively. On each of the imaging planes is defined a coordinate system in which the intersection with the optical axis 7 is defined as the origin. The x-axis is defined in the horizontal direction of the imaging plane, and the y-axis is defined in the vertical direction of the imaging plane. A point of projection on the imaging plane as identified is a position in the coordinate system.

The blending unit 43 first re-projects a point of projection on the imaging plane 420 onto the virtual imaging plane 430. If the image captured by the second imaging unit 30 is used as an equal-magnification image, fz=fo. If the image is magnified or reduced before being used, fz=Kf*fo, where Kf denotes a magnification or reduction factor. Denoting the position of a point 422a on the imaging plane 420 onto which the spatial point Q425 is projected as (xo, yo), the point is projected onto the virtual imaging plane 430 at a point (−Kf*xo, Kf*yo). Since the image captured by the second imaging unit 30 is mirror-reversed by mirror reversal unit 42, the sign of the x-coordinate is reversed.

The blending unit 43 then reduces the image captured by the first imaging unit 20. The magnification or reduction factor is denoted by Kw, which is adjusted in accordance with the magnification or reduction factor Kf for fz. Denoting the position of a point 412a on the imaging plane 410 onto which the spatial point P415 is projected as (xw, yw), the point is projected at a point (Kw*xw, Kw*yw) to reduce the image.

Ultimately, the blending unit 43 acquires the size and shape of the overwriting area from the presentation method storage unit 45. Of those points at (Kw xw, Kw*yw) obtained by reducing the image captured by the first imaging unit 20, only those points included in the overwriting area are selected and re-projected onto the virtual imaging plane 430, overwriting the existing image. The blended image 302 is obtained from the image 300a and the image 300b through the process described above.

Figure 9:
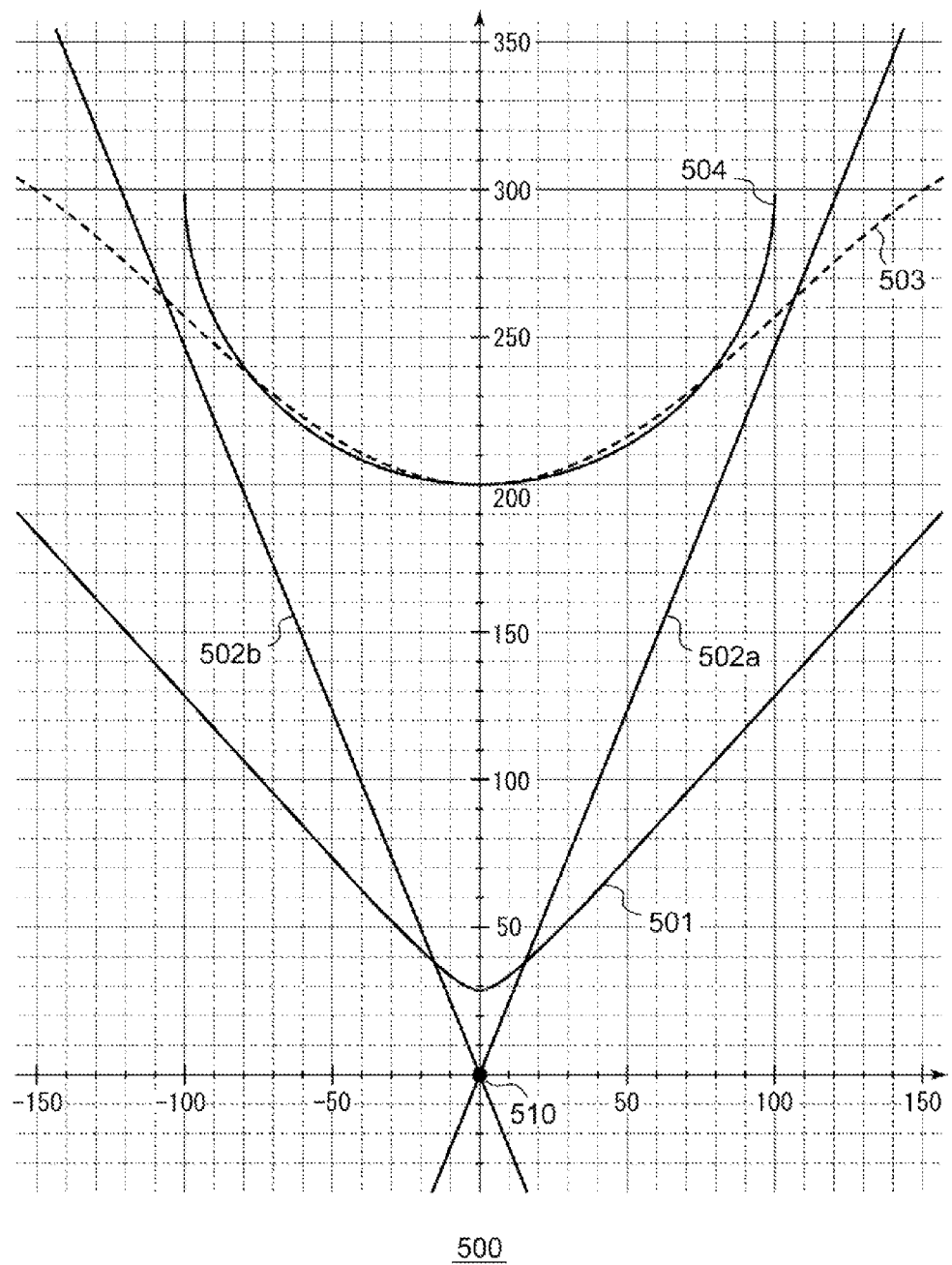
FIG. 9 shows an exemplary shape of a screen onto which the blended image produced according to an example.

FIG. 9 shows examples of the hyperboloid forming the convex reflector 33 and the shape of the screen derived from the hyperboloid, on a cross section 500 including the two focal points of the hyperboloidal mirror. A coordinate system in which the focal point remote from the hyperboloid is defined as an origin 510 is established. The y-axis is defined along a straight line connecting the two focal points, and the x-axis is defined to be perpendicular to the y-axis.

The shape of the hyperboloid in the cross section 500 matches a curve 501 represented by an expression $y=b*\{1+(x/a)^2\}^{1/2}+b+c$. Since the diameter of the hyperboloidal mirror is 30 mm, the straight lines connecting the origin and two points on the curve 501 that are located on the outer circumference of the mirror and located on the cross section 500 will be a straight line 502a and a straight line 502b in FIG. 9. The portion of the curve 501 bounded by the straight lines 502a and 502b represents the cross section of the hyperboloidal mirror.

The circular area 16 in the blended image 302 is obtained by forming an image on the hyperboloidal mirror (convex reflector 33) on a plane. By projecting the circular area 16 onto the curved screen 54 defined by the curve 501, using the origin 510 as a source of projection, the image on the hyperboloidal mirror (convex reflector 33) is reproduced. In this process, distortion resulting from imaging on a plane is corrected. Since the central portion of a hyperboloidal mirror is relatively flat, the rectangular area 17 in the blended image 302 projected onto the curved surface will not appear unnatural.

A curve 503 is obtained by plotting points (7x, 7y) derived from magnifying coordinates of points (x, y) on the curve 501 by a factor of 7. The portion of the curve 503 bounded by the straight lines 502a and 502b can be used as a screen.

Since the curve 503 is analogous with the curve 501, the image projected onto the curved screen 54 defined by the curve 501 can be projected onto the curved screen 54 defined by the curve 503 as magnified. In this process, distortion resulting from imaging on a plane is corrected, as in the case of the curved screen 54 defined by the curve 501.

The portion of the curve 503 bounded by the straight lines 502a and 502b is similar to the shape of a semicircle 504. It is therefore possible to present a blended image corrected for distortion on a hemispherical screen.

The operation according to the structure described above is as follows. The user enters a magnification or reduction factor of a blended image and a presentation method in the image capturing device 100 via the user interface. Subsequently, when a subject is imaged using the image capturing device 100, a determination is made as to whether to reverse the image depending on the presentation method. A blended image of a resolution determined by the magnification or reduction factor is output.

As described above, it is possible, according to the first embodiment, to present a wide-angle, less discontinuous image with a natural perspective.

(Second Embodiment)

A summary of the second embodiment will be given. Like the image capturing device 100 according to the first embodiment, the image capturing device 100 according to the second embodiment captures an image showing a subject in front by using a camera, captures an image showing a subject on the sides by using another camera, and blends the captured images. In the image capturing device 100 according to the second embodiment, a mirror-reversed image on the convex reflector capturing an image showing a subject on the sides is optically reversed by using another reflecting plate so as to generate an image that is not mirror-reversed consequently. In the following description, the description of those features common to those of the first embodiment will be omitted or simplified as appropriate.

Figure 10:
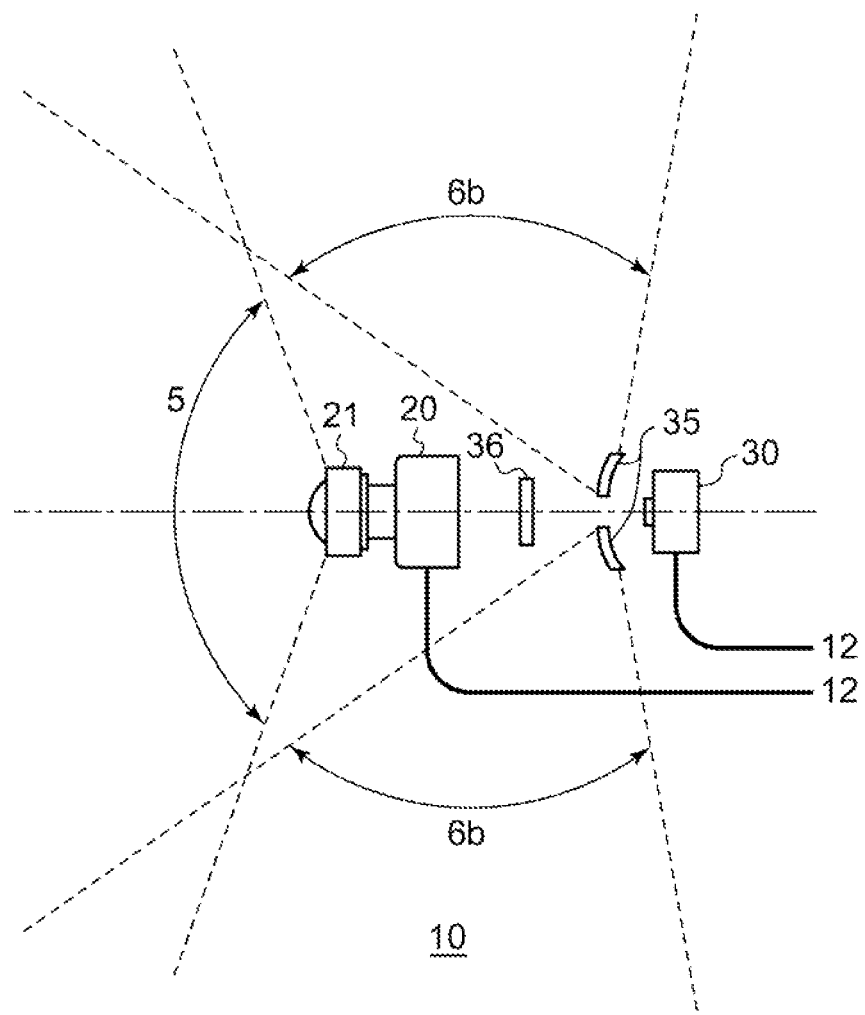
FIG. 10 schematically shows the internal configuration of the visual sensor according to an alternative embodiment.

FIG. 10 schematically shows the internal configuration of the visual sensor 10 according to the second embodiment. The visual sensor 10 according to the second embodiment includes a total of two cameras including a camera as a first imaging unit 20 and a camera as a second imaging unit 30 and also includes a convex reflector 35 with an opening and a planar reflector 36. The visual sensor 10 according to the second embodiment is connected to an image processing unit configured similarly as the image processing unit 12 according to the first embodiment.

The convex reflector 35 with an opening is located behind the first imaging unit 20 and shares the optical axis 7 with the first imaging unit 20. The convex reflector 35 with an opening is implemented by a convex reflector plate mirroring a subject in front and beside the visual sensor 10. An opening is formed at the center of the reflector plate. Between the first imaging unit 20 and the convex reflector 35 is provided the planar reflector 36. The planar reflector 36 mirrors an image mirrored by the convex reflector 35 with an opening. The planar reflector 36 is oriented in a direction perpendicular to the optical axis 7.

The second imaging unit 30 is located behind the convex reflector 35 with an opening and shares the optical axis 7 with the first imaging unit 20. The second imaging unit 30 captures an image mirrored on the planar reflector 36 via the opening of the convex reflector 35. The image captured by the first imaging unit 20 and the image captured by the second imaging unit 30 are transmitted to the image processing unit 12.

Referring to FIG. 10, by arranging the first imaging unit 20, the second imaging unit 30, the convex reflector 35 with an opening, and the planar reflector 36 as described above, the first imaging unit 20 will capture an image showing a subject in front (an image covering a range indicated by numeral 5), and the second imaging unit 30 will capture an image reflected from the planar reflector 36, which mirrors an image showing a subject on the sides (an image covering a range indicated by numeral 6b) mirrored by the convex reflector 35. The image showing a subject beside the visual sensor 10 is mirror-reversed by the convex reflector 35 with an opening and by the planar reflector 36. As a result, the image captured by the second imaging unit 30 ends up in an image that is not mirror-reversed.

The switcher unit 46 refers to the presentation method storage unit 45 and learns the method of presenting a blended image blended by the blending unit 43. If the presentation method is of projection type, the switcher unit 46 outputs the image captured by the first imaging unit 20 and the image captured by the second imaging unit 30 directly to the blending unit 43. The blending unit 43 blends the images acquired from the switcher unit 46, adjusting the resolution, and outputs the blended image.

If the presentation method is of transmission type, the switcher unit 46 outputs both the image captured by the first imaging unit 20 and the image captured by the second imaging unit 30 to the mirror reversal unit 42. The mirror reversal unit 42 reverses the two images acquired from the switcher unit 46 and outputs the mirror-reversed images to the blending unit 43. The blending unit 43 blends the images acquired from the mirror reversal unit 42, adjusting the resolution, and outputs the blended image.

Figure 11:
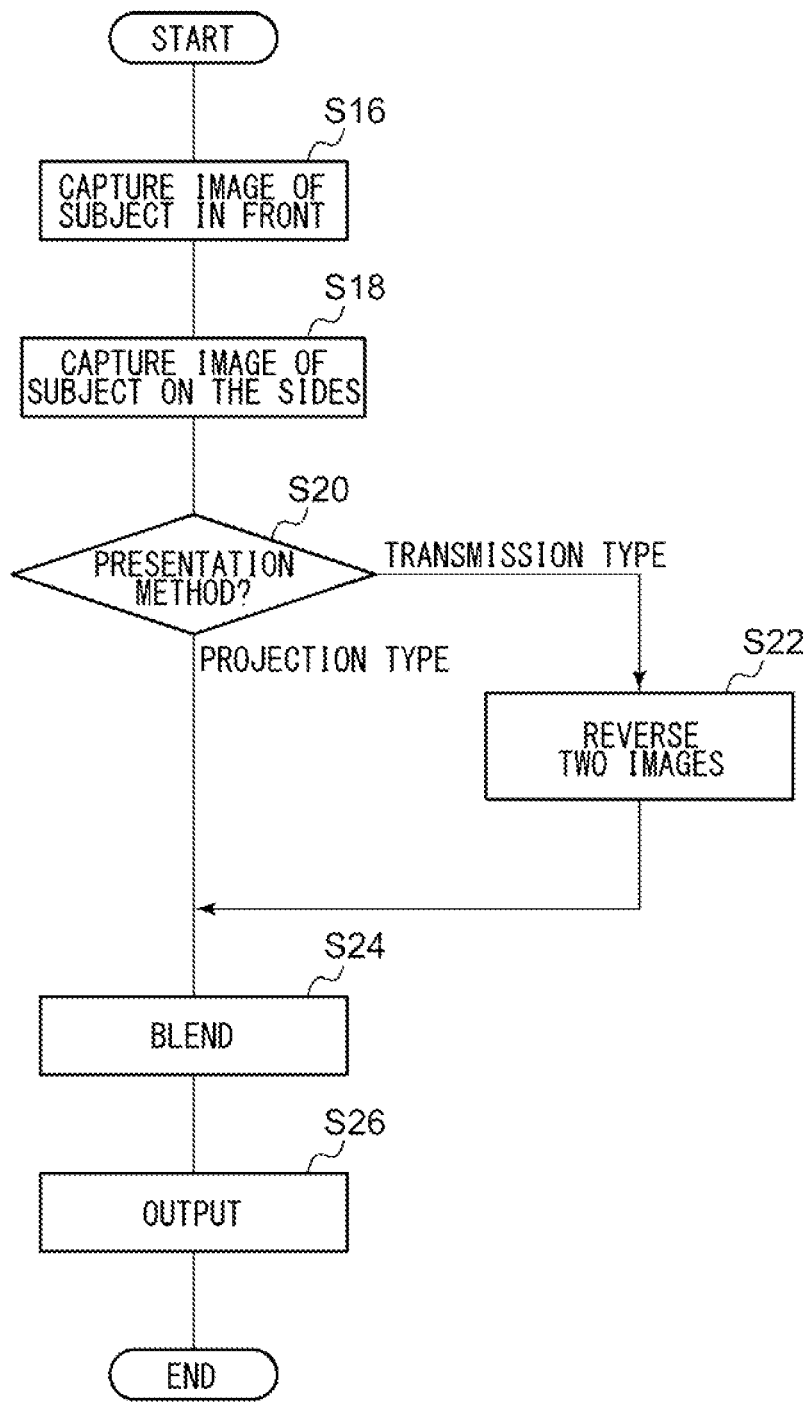
FIG. 11 is a flowchart showing the steps performed in the image capturing device according to the alternative embodiment.

FIG. 11 is a flowchart showing the steps performed in the image capturing device 100 according to the second embodiment. The process in the flowchart is started when the image capturing device 100 starts capturing an image.

The first imaging unit 20 captures an image in front of the visual sensor 10 (S16). The second imaging unit 30 captures an image mirrored by the convex reflector 35 with an opening and further reflected by the planar reflector 36 (S18). Subsequently, the switcher unit 46 refers to the presentation method storage unit 45 and learns the method of presenting a blended image. If the presentation method is of transmission type (transmission type in S20), the switcher unit 46 outputs the image showing a subject in front and captured by the first imaging unit 20 and the image showing a subject on the sides and captured by the second imaging unit 30 to the mirror reversal unit 42. The mirror reversal unit 42 reverses the acquired two images (S22). If the presentation method is of projection type (projection type in S20), the switcher unit 46 outputs the image showing a subject in front and captured by the first imaging unit 20 and the image showing a subject on the sides and captured by the second imaging unit 30 directly to the blending unit 43 without outputting images to the mirror reversal unit 42.

The blending unit 43 blends the two images output from the switcher unit 46 or the mirror reversal unit 42, adjusting the resolution (S24). The projector 50 projects the blended image blended by the blending unit 43 to the curved screen 54 (S26). When the projector 50 outputs the blended image, the process in the flowchart is terminated.

The operation according to the structure described above is as follows. The user enters a magnification or reduction factor of a blended image and a presentation method in the image capturing device 100 via the user interface. Subsequently, when a subject is imaged using the image capturing device 100, a determination is made as to whether to reverse the image depending on the presentation method. A blended image of a resolution determined by the magnification or reduction factor is output.

As described above, it is possible, according to the second embodiment, to present a wide-angle, less discontinuous image with a natural perspective.

Described above is an explanation based on an exemplary embodiment. The embodiment is intended to be illustrative only and it will be obvious to those skilled in the art that various modifications to constituting elements and processes could be developed and that such modifications are also within the scope of the present invention.

In the above description, the blending unit 43 is assumed to reduce an image. Alternatively, the mirror reversal unit 42 may reduce an image before reversing the image. This is advantageous in that the size of an image subject to mirror reversal is reduced so that the amount of computation required for mirror reversal is controlled accordingly.

In the above description, the control unit 41 is assumed to control which of the image captured by the first imaging unit 20 and the image captured by the second imaging unit 30 should be mirror-reversed depending on the method of presenting a blended image ultimately. Alternatively, it may be ensured that the image output from the blending unit 43 is not a mirror-reversed image, and, where mirror reversal is necessary, a mirror reversal circuit (not shown) provided in front of the projector 50 may be used for mirror reversal or a reflector plate may be used to reverse the image projected by the projector 50, before the image is projected onto the screen.

In the above description, it is assumed that an image showing a real subject captured by the visual sensor 10 is projected onto the curved screen 54. Alternatively, the image projected onto the curved screen 54 may be a computer graphic image created on a computer. This can be achieved by virtually providing the visual sensor 10 according to the first embodiment or the second embodiment in a virtual three-dimensional space and generating the image captured by the visual sensor 10 by simulation. This is advantageous in that a three-dimensional game with a natural perspective can be provided, or a virtual endoscopic image can be provided using a three-dimensional image of a human body captured by an X-ray computed tomography (CT).

What is claimed is:

1. An image capturing device comprising:
a first imaging camera, which captures a front image showing a subject in a front view;
a convex reflector located behind an imaging plane of an optical system formed by the first imaging camera, which shares an optical axis with the first imaging camera and mirrors at least the subject beside the convex reflector as a side image, a convex portion of the convex reflector oriented forward, facing the subject;
a second imaging camera, which shares the optical axis between the first imaging camera and the convex reflector and captures the side image mirrored by the convex reflector; and
an image processor, which adjusts resolutions of the front image captured by the first imaging camera and the side image captured by the second imaging camera, obtains a mirror-reversed image from either the front image captured by the first imaging camera or from the side image captured by the second imaging camera, and blends the mirror-reversed front image or mirror-reversed side image with the side image or front image, respectively, thus creating a blended image;
wherein vertical and horizontal sizes of the image captured by the first imaging camera fits a resolution of the image captured by the second imaging camera.

2. The image capturing device according to claim 1, further comprising:
acquiring a magnification or reduction factor from a user,
wherein upon acquiring the magnification or reduction factor, the image processor further re-adjusts a resolution of the image captured by the first imaging camera and a resolution of the image captured by the second imaging camera and re-builds the blended image.

3. An image presentation system comprising:
the image capturing device according to claim 1;
a projector, which projects the blended image generated by the image capturing device; and
a curved screen, which reflects the projected blended image from the projector.

4. An image capturing device comprising:
a first imaging camera, which captures a front image showing a subject in a front view;
a convex reflector located behind an imaging plane of an optical system formed by the first imaging camera, which shares an optical axis with the first imaging camera and mirrors at least the subject beside the convex reflector, along the optical axis, and a convex portion of the convex reflector being oriented forward, facing the subject;
a planar reflector located between the first imaging camera and the convex reflector that mirrors the side image mirrored by the convex reflector;
a second imaging camera, which shares the optical axis with the first imaging camera and the convex reflector and captures the side image mirrored by the convex reflector via the opening hole of the convex reflector; and
an image processor which adjusts resolutions of the front image from the first imaging camera and the side image from the second imaging camera, and generates a single blended image by overwriting a center portion of the side image from the second imaging camera with the front image from the first imaging camera;
wherein vertical and horizontal sizes of the image captured by the first imaging camera fits a resolution of the image captured by the second imaging camera.

5. The image capturing device according to claim 4, further comprising:
acquiring a magnification or reduction factor from a user,
wherein upon acquiring the magnification or reduction factor, the image processor further re-adjusts a resolution of the image captured by the first imaging camera and a resolution of the image captured by the second imaging camera and re-builds the blended image.

6. An image presentation system comprising:
the image capturing device according to claim 4;
a projector, which projects the blended image generated by the image capturing device; and
a curved screen, which reflects the projected blended image from the projector.

* * * * *